Oct. 1, 1929.   F. JARDINE   1,730,120
PISTON
Filed April 9, 1926
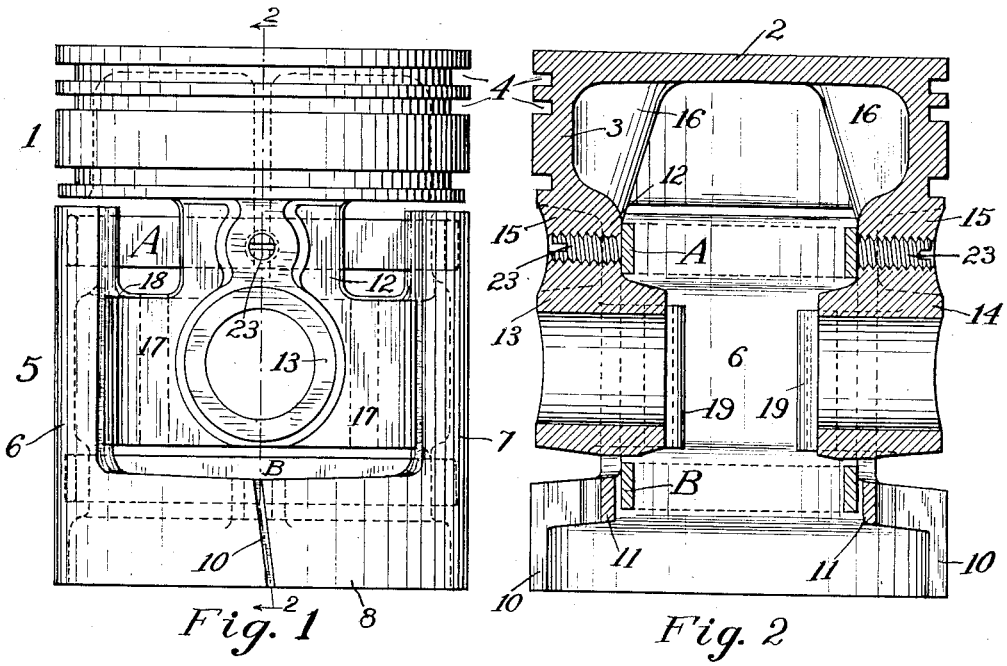
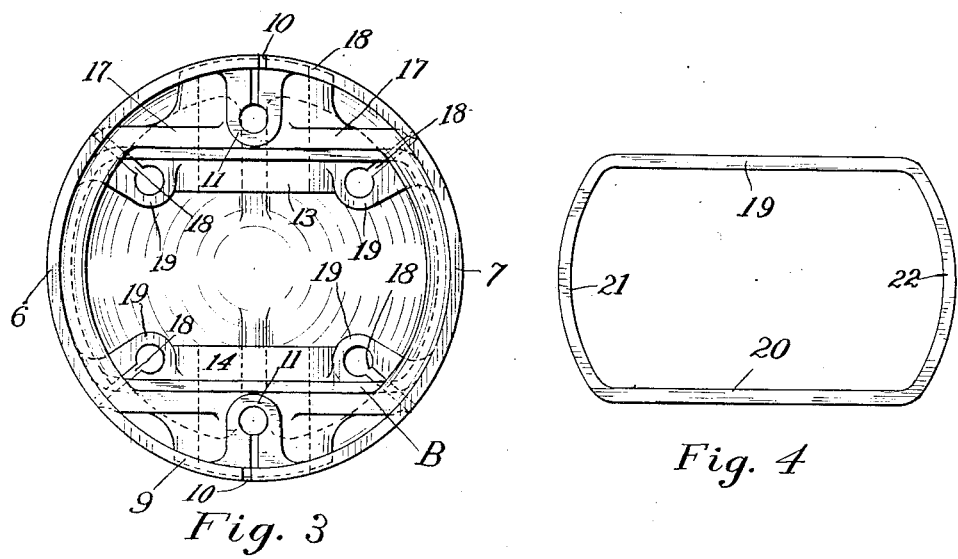
INVENTOR,
Frank Jardine
BY
Richey & Watts
ATTORNEYS Patented Oct. 1, 1929

1,730,120

UNITED STATES PATENT OFFICE

FRANK JARDINE, OF CLEVELAND, OHIO, ASSIGNOR TO ALUMINUM COMPANY OF AMERICA, OF PITTSBURGH, PENNSYLVANIA, A CORPORATION OF PENNSYLVANIA

PISTON

Application filed April 9, 1926. Serial No. 100,772.

This invention relates to pistons and more particularly to pistons composed of a material having a higher or different co-efficient of expansion than that of the cylinders in which they are to operate, as for instance, where aluminum or aluminum alloy pistons are used in cylinders of cast iron or the like.

As is well known, such pistons possess many desirable qualities such as lightness, high heat conductivity and the like. However, the differences in expansion of the pistons and cylinders produce various difficulties and disadvantages, for example, the pistons will either stick when hot or will slap when cold.

The principal object of my invention is to provide a piston which may be made of aluminum, aluminum alloy, or the like, which can be fitted with a very small clearance and which will maintain this clearance substantially unchanged throughout the temperature ranges met in practice, without slapping, binding, scoring of the cylinder, or undue wear in the piston itself.

These and other objects of my invention, as well as the invention itself, will be better understood from the description of one practical embodiment of the invention which is illustrated in the accompanying drawings, in which—

Fig. 1 is a side elevation of the piston;
Fig. 2 is a longitudinal cross section thereof on the line 2—2 of Fig. 1;
Fig. 3 is a bottom plan view thereof, and
Fig. 4 is a plan view of one of the controlling rings.

The piston has a head 1 provided with a top 2 and depending annular flange 3 provided with piston ring grooves 4. Below the head is a skirt 5 including bearing faces 6 and 7 spaced apart as shown and connected at their lower ends by strap-shaped parts 8 and 9. The straps are preferably split as at 10 and the splits spanned by flexible arcuate bridges or culverts 11 which permit the bottom of the piston to expand circumferentially without increasing its diameter.

Depending from the head are walls 12 which carry the wrist pin bearings 13 and 14 and which are reinforced by webs 15 and 16. The wrist pin bearings are joined to the bearing faces by supporting webs 17 which are split at 18 and the splits spanned by flexible arcuate bridges 19. The piston is made of some material such as aluminum or aluminum alloy and expands and contracts at a different rate from that of the cylinder in which it operates.

The bearing faces are connected togther by means of a different co-efficient of expansion from the skirt such as rings or links A and B composed of iron or steel. As shown in Fig. 4, the particular links used are continuous and have straight sides 19 and 20 and curved ends 21 and 22.

The ends of the links are embedded in the bearing faces and the sides extend across the interior of the piston and are unobstructed on their inner surfaces. These links control the distance between the bearing faces by tieing these together, and as the material of the links expands at substantially the same rate as the cylinder walls, the clearance between the bearing faces and cylinder is maintained substantially constant. The flexible bridges permit the slits to be partially closed and thus allow for the expansion of the highly expansive material of which the skirt is made.

The webs 15 are wide and are provided with threaded apertures for adjusting means 23. The adjusting means are illustrated as set screws which bear against the outer surfaces of sides 19 and 20 of link A and may be adjusted to bend these inwardly. This adjustment produces two results, first, the distance between the bearing faces is decreased as the sides of the links are bent, and, second, the action of the link upon changes of temperature is changed. This is mainly due to the changes in flexure of the link sides as webs 15, and consequently the set screws move outwardly or inwardly upon expansion or contraction of the piston head, and exert different pressures upon the link.

Of course, many variations and modifications of the piston shown will readily occur to those skilled in this art, and I, therefore, claim all embodiments of my invention which come within the scope of the subjoined claims.

I claim:—

1. A piston comprising a head, depending wrist pin bearings carried thereby, a skirt having two bearing faces, resilient means connecting said bearing faces together to the wrist pin bearings a plurality of vertically special links connecting said bearing faces together, said links having straight sides extending from one bearing face to the other, and curved ends embedded in the bearing faces, and means intermediate said bearing faces pressing the sides of the links towards each to flex the connecting portions thereof.

2. A piston having a skirt composed of two bearing faces, a link having an end embedded in each of said faces and its sides connecting the faces, a head having depending wrist pin bearings, means connecting the bearing faces to the wrist pin bearings below the link, and means carried by the head pressing the sides of the link toward each other.

3. A piston skirt having two bearing faces, a deformable tie member holding the faces together, and means for deforming said tie member.

4. A hollow piston skirt having two bearing faces and a horizontal hollow link having its ends embedded in said faces and controlling the distance therebetween, the sides of the link being entirely within the hollow of the piston.

5. A piston having a head, a skirt comprising two spaced bearing faces, a link having straight sides and curved ends, one end of the link being embedded in each face, and means carried by the head for bending the sides of the link.

6. A piston having a head, two walls depending therefrom, each carrying a wrist pin bearing and a set screw, a skirt comprising spaced bearing faces resiliently connected to said bearings, and a link with its ends embedded in said bearing faces and its sides passing between said depending walls and in contact with the ends of said set screws.

7. A piston skirt having two bearing faces tied together by an adjustable tie, and means for adjusting the distance between the faces and changing the rate of expansion of the skirt on the diameter normal to said faces.

8. A piston skirt having two bearing faces, connecting means therebetween, and means for varying the rate of expansion across the bearing faces.

9. A piston skirt having two bearing faces, a flexible tie holding the faces together, and means for adjusting the flexure of the tie.

10. A piston comprising a head, walls depending therefrom and carrying wrist pin bearings, a skirt having bearing faces intermediate said wrist pin bearings and flexible strap-like connections between said bearing faces and below said wrist pin bearings, flexible integral connections between the bearing faces and wrist pin bearings, connections between the bearing faces of a different material than the rest of the piston and having chordal portions extending between the bearing faces and arcuate portions embedded therein, and adjustable means carried by the depending walls for flexing said chordal portions.

11. A piston comprising a head, walls depending therefrom, webs reinforcing said walls, wrist pin bearings carried by said walls, a skirt having bearing faces intermediate said wrist pin bearings and resiliently connected thereto, resilient connections between said bearing faces below said bearings, chordal connectors of less expansive material than the remainder of the piston connecting said bearing faces, and adjustable means carried by the depending walls and their webs for flexing the chordal connectors.

12. A piston comprising a head, walls depending therefrom and carrying wrist pin bearings, a skirt having bearing faces intermediate said wrist pin bearings, flexible webs joining said bearing faces below said wrist pin bearings, other flexible webs joining said bearing faces to said depending walls, all of a material having a high co-efficient of expansion, a horizontal controlling link of a material having a lower co-efficient of expansion connecting the bearing faces, the link having arcuate ends embedded in the bearing faces and chordally extending sides therebetween, the sides being free to bend in one direction, and set screws bearing upon the sides of the links for bending them in said direction.

13. A piston comprising a head, walls depending therefrom and carrying wrist pin bearings, a skirt having bearing faces intermediate said wrist pin bearings, flexible webs joining said bearing faces below said wrist pin bearings, other flexible webs joining said bearing faces to said depending walls, all of a material having a high co-efficient of expansion, a horizontal controlling link of a material having a lower co-efficient of expansion connecting the bearing faces, the link having arcuate ends embedded in the bearing faces and chordally extending sides therebetween, the sides being free to bend in one direction, an adjustable means carried by the head to bend said link sides.

14. A piston skirt having two bearing faces, horizontally disposed hollow links controlling the distance between said faces, the sides of said links being free to move inwardly.

15. A piston having a skirt comprising two bearing faces, spaced horizontal links having their ends embedded in said faces and controlling the distance therebetween, the sides of the links being entirely within the hollow of the piston.

16. A piston skirt having two bearing faces, an adjustable tie member holding the faces together, and means for adjusting said tie member.

In testimony whereof I hereunto affix my signature this 5 day of April, 1926.

FRANK JARDINE.